US011954440B1

(12) United States Patent
Naderan et al.

(10) Patent No.: US 11,954,440 B1
(45) Date of Patent: Apr. 9, 2024

(54) APPARATUS AND METHOD FOR PROCESSING DIGITAL INVOICES WITH INVOICE ENTITY FEEDBACK OVERRIDE OF TRAINED MACHINE LEARNING MODELS

(71) Applicant: AppZen, Inc., San Jose, CA (US)

(72) Inventors: Edris Naderan, San Jose, CA (US); Parivesh Priye, San Jose, CA (US); Amrit Singhal, San Jose, CA (US); Arghyadeep Giri, San Jose, CA (US); Debashish Panigrahi, San Jose, CA (US); Hyram Du, San Jose, CA (US); Kunal Verma, San Jose, CA (US)

(73) Assignee: AppZen, Inc., San Jose, CA (US)

( * ) Notice: Subject to any disclaimer, the term of this patent is extended or adjusted under 35 U.S.C. 154(b) by 327 days.

(21) Appl. No.: 17/478,583

(22) Filed: Sep. 17, 2021

(51) Int. Cl.
*G06F 40/295* (2020.01)
*G06F 16/11* (2019.01)
*G06F 18/21* (2023.01)
*G06N 20/00* (2019.01)
*G06V 30/412* (2022.01)

(52) U.S. Cl.
CPC .......... *G06F 40/295* (2020.01); *G06F 16/116* (2019.01); *G06F 18/2178* (2023.01); *G06N 20/00* (2019.01); *G06V 30/412* (2022.01)

(58) Field of Classification Search
CPC .. G06F 16/116; G06F 18/2178; G06F 40/295; G06N 20/00; G06V 30/412
See application file for complete search history.

(56) References Cited

U.S. PATENT DOCUMENTS

| | | | | |
|---|---|---|---|---|
| 10,607,042 | B1* | 3/2020 | Dasgupta | G06F 40/253 |
| 2004/0107203 | A1* | 6/2004 | Burdick | G06F 16/2365 |
| 2020/0226503 | A1* | 7/2020 | Subramanian | G06Q 10/04 |
| 2022/0027876 | A1* | 1/2022 | Zhou | G06N 20/00 |
| 2022/0108073 | A1* | 4/2022 | Menon | G06F 18/2193 |

(Continued)

OTHER PUBLICATIONS

Francis, Sumam, et al. "Transfer learning for named entity recognition in financial and biomedical documents." Information 10.8 (2019), pp. 1-17. (Year: 2019).*

(Continued)

*Primary Examiner* — Jesse S Pullias
*Assistant Examiner* — Michael C. Lee
(74) *Attorney, Agent, or Firm* — Cooley LLP

(57) ABSTRACT

A non-transitory computer readable storage medium has instructions executed by a processor to invoke an image processing module to ingest a digital invoice. An evaluation module derives metrics from the digital invoice. A semantic document processing module forms entity extracts from the digital invoice, where each entity extract from the digital invoice has a potential mapping to a trained machine learning model element. An entity extraction correction module overrides the potential mapping to the trained machine learning model element when user feedback from a similar entity extract from a previously processed digital invoice exists to produce a processed digital invoice with a user feedback element inconsistent with the potential mapping to the trained machine learning model element. The processed digital invoice is delivered to an accounting module for final disposition of the digital invoice.

14 Claims, 9 Drawing Sheets

(56) References Cited

U.S. PATENT DOCUMENTS

2023/0022845 A1* 1/2023 Meng .................... G06F 40/279

OTHER PUBLICATIONS

Shehzad, Khurram, et al. "Named Entity Recognition in Semi Structured Documents Using Neural Tensor Networks." Document Analysis Systems: 14th IAPR International Workshop, DAS 2020, Wuhan, China, Jul. 26-29, 2020, pp. 398-409 (Year: 2020).*

Hwang, Wonseok, et al. "Spatial dependency parsing for 2D document understanding." arXiv preprint arXiv:2005.00642 (2020), pp. 1-9 (Year: 2020).*

* cited by examiner

Invoice A

ABC

ABC Lab
12 main street
Santa Clara, CA 98765
Bill to:
UniPharm Co.
40 Market Blvd
New York, NY 12300

Date: 05/02/21
Inv Num: 9876
PO#: 91021
shipping date: 10/2/21

| Description | unit price | qnt. | amount |
|---|---|---|---|
| 56FTLX Tube | $12.00 | 1000 | $12,000.00 |

Freight value: $500.00
Tax: $1,000.00
Total: $13,000.00

Entities in the similar invoices have similar embeddings

Invoice B

ABC

ABC Lab
12 main street
Santa Clara, CA 98765
Bill to:
UniPharm Co.
40 Market Blvd
New York, NY 12300

Date: 11/11/21
Inv Num: 123456
PO#: 98800
shipping date: 2/12/21

| Description | unit price | qnt. | amount |
|---|---|---|---|
| PJP 33ft XL | $20.00 | 2000 | $40,000.00 |

Freight value: $2,000.00
Tax: $3,200.00
Total: $45,200.00

APPARATUS AND METHOD FOR PROCESSING DIGITAL INVOICES WITH INVOICE ENTITY FEEDBACK OVERRIDE OF TRAINED MACHINE LEARNING MODELS

FIELD OF THE INVENTION

This invention relates generally to digital object processing. More particularly, this invention is directed toward techniques for automatically processing digital invoices with trained machine learning models that are augmented with invoice entity feedback override.

BACKGROUND OF THE INVENTION

A digital invoice may contain different line items characterizing different terms associated with a transaction. Isolating the different invoice entities into individual image objects is a technical challenge. Automatically approving terms of different invoice entities is also a challenge.

Thus, there is a need for improved techniques for processing digital invoices.

SUMMARY OF THE INVENTION

A non-transitory computer readable storage medium has instructions executed by a processor to invoke an image processing module to ingest a digital invoice. An evaluation module derives metrics from the digital invoice. A semantic document processing module forms entity extracts from the digital invoice, where each entity extract from the digital invoice has a potential mapping to a trained machine learning model element. An entity extraction correction module overrides the potential mapping to the trained machine learning model element when user feedback from a similar entity extract from a previously processed digital invoice exists to produce a processed digital invoice with a user feedback element inconsistent with the potential mapping to the trained machine learning model element. The processed digital invoice is delivered to an accounting module for final disposition of the digital invoice.

BRIEF DESCRIPTION OF THE FIGURES

The invention is more fully appreciated in connection with the following detailed description taken in conjunction with the accompanying drawings, in which:

FIG. 4 illustrates a digital invoice processed in accordance with an embodiment of the invention FIG. 5 illustrates invoice entity feedback processed in accordance with an embodiment of the invention.

FIG. 6 illustrates invoice entity override performed in accordance with an embodiment of the invention.

FIG. 7 illustrates invoice duplication detection performed in accordance with an embodiment of the invention.

Like reference numerals refer to corresponding parts throughout the several views of the drawings.

DETAILED DESCRIPTION OF THE INVENTION

Figure 1:
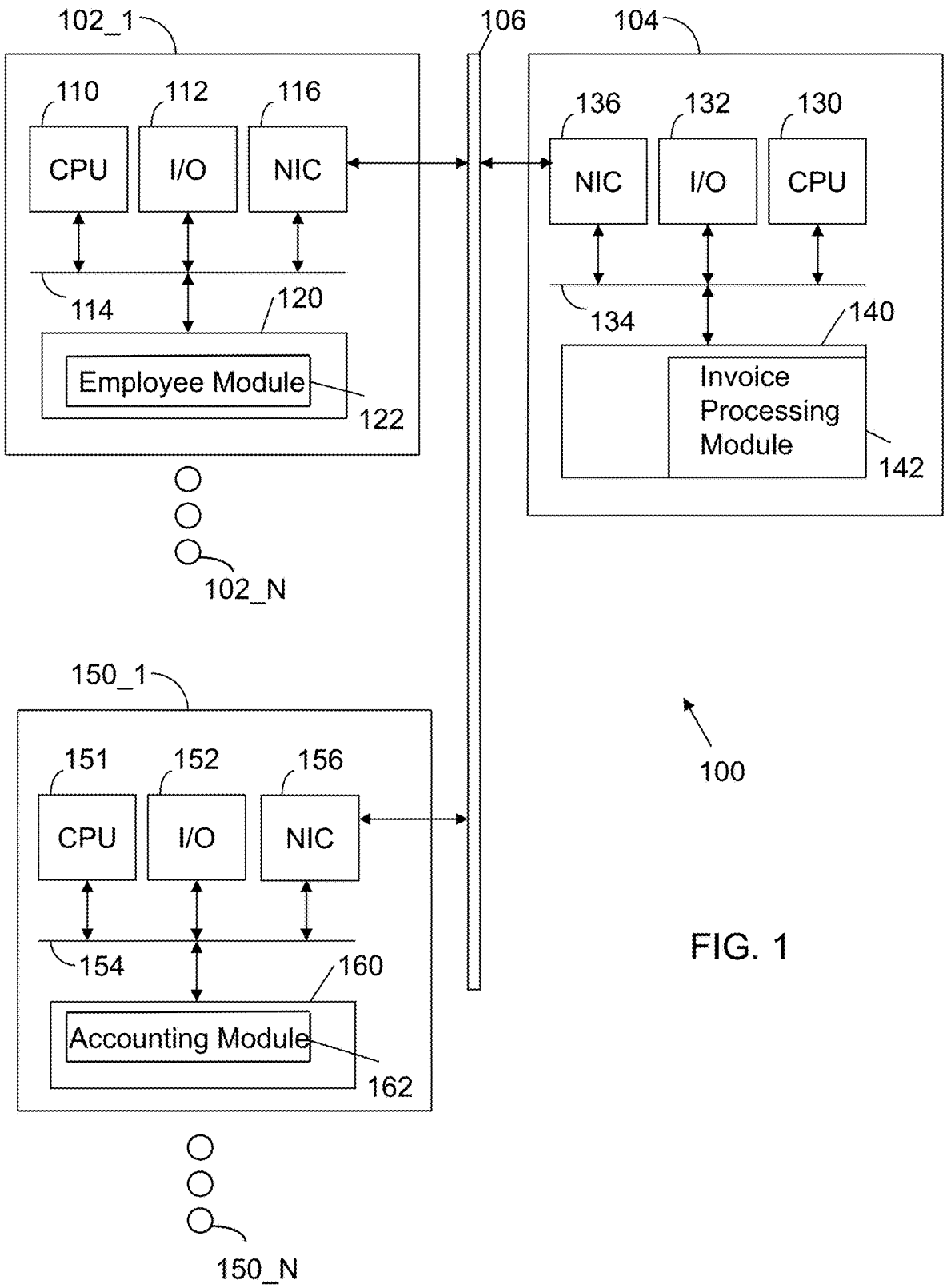
FIG. 1 illustrates a system configured in accordance with an embodiment of the invention.

FIG. 1 illustrates a system 100 configured in accordance with an embodiment of the invention. The system 100 includes a set of client devices 102_1 through 102_N that communicate with a server 104 via a network 106, which may be any combination of wired and wireless networks. Each client device includes a processor (e.g., central processing unit) 110 and input/output devices 112 connected via a bus 114. The input/output devices 112 may include a keyboard, mouse, touch display and the like. A network interface circuit 116 is also connected to the bus 114. The network interface circuit 116 provides connectivity to network 106. A memory 120 is also connected to the bus 114. The memory 120 stores instructions executed by processor 110. The memory 120 may store an employee module 122, which is an application that allows a user to upload a digital invoice for approval. For example, the employee module 122 may provide an employee with a form with prompts to attach a digital invoice, which is subsequently sent to server 104.

Server 104 includes a processor 130, input/output devices 132, a bus 134 and a network interface circuit 136. A memory 140 is connected to the bus 134. The memory stores an invoice processing module 142 with instructions executed by processor 136 to implement the operations disclosed herein.

System 100 also includes employer machines 150_1 through 150_N. Each employer machine includes a processor 151, input/output devices 152, a bus 154 and a network interface circuit 156. A memory 160 is connected to bus 154. The memory stores an accounting module 162 with instructions executed by processor 151. The accounting module 162 implements standard accounting operations, including invoice payment for approved digital invoices.

Server 104 may operate to process digital invoices submitted by employees operating client devices 102_1 through 102_N. The results of processing the digital invoices are communicated to employer machines 1501 through 150_N. Alternately, the invoice processing module 142 may be implemented on employer machines 150_1 through 150_N.

Figure 2:
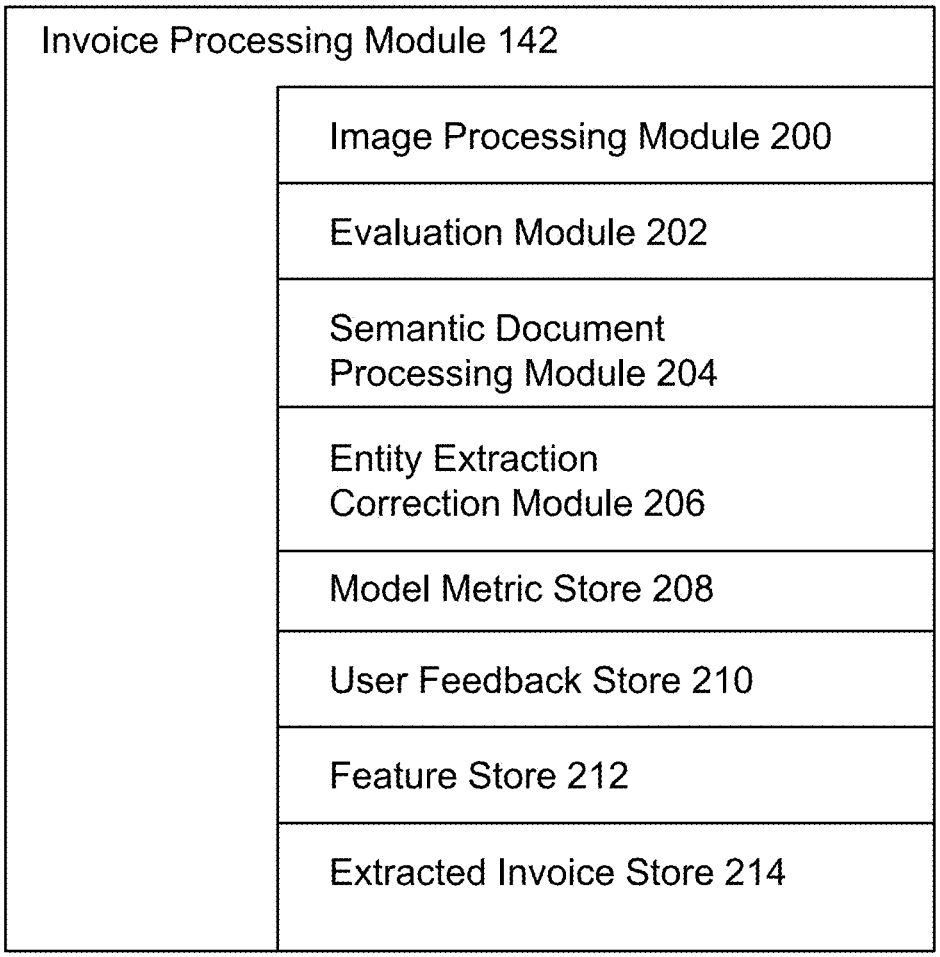
FIG. 2 illustrates an invoice processing module configured in accordance with an embodiment of the invention.

FIG. 2 illustrates different modules associated with an embodiment of the invoice processing module 142. An image processing module 200 includes instructions executed by processor 130 to transform an uploaded digital invoice into a format more conducive to subsequent processing, such as a Portable Network Graphics file format. The data is then subject to optical character recognition to extract text and text coordinates from the digital invoice.

The invoice processing module 142 also includes an evaluation module 202. The evaluation module 202 generates a metric datapoint characterizing the correctness of a single entity in the digital invoice. The evaluation module 202 also captures feedback representing user review of an entity in the digital invoice, as demonstrated below.

Figure 3:
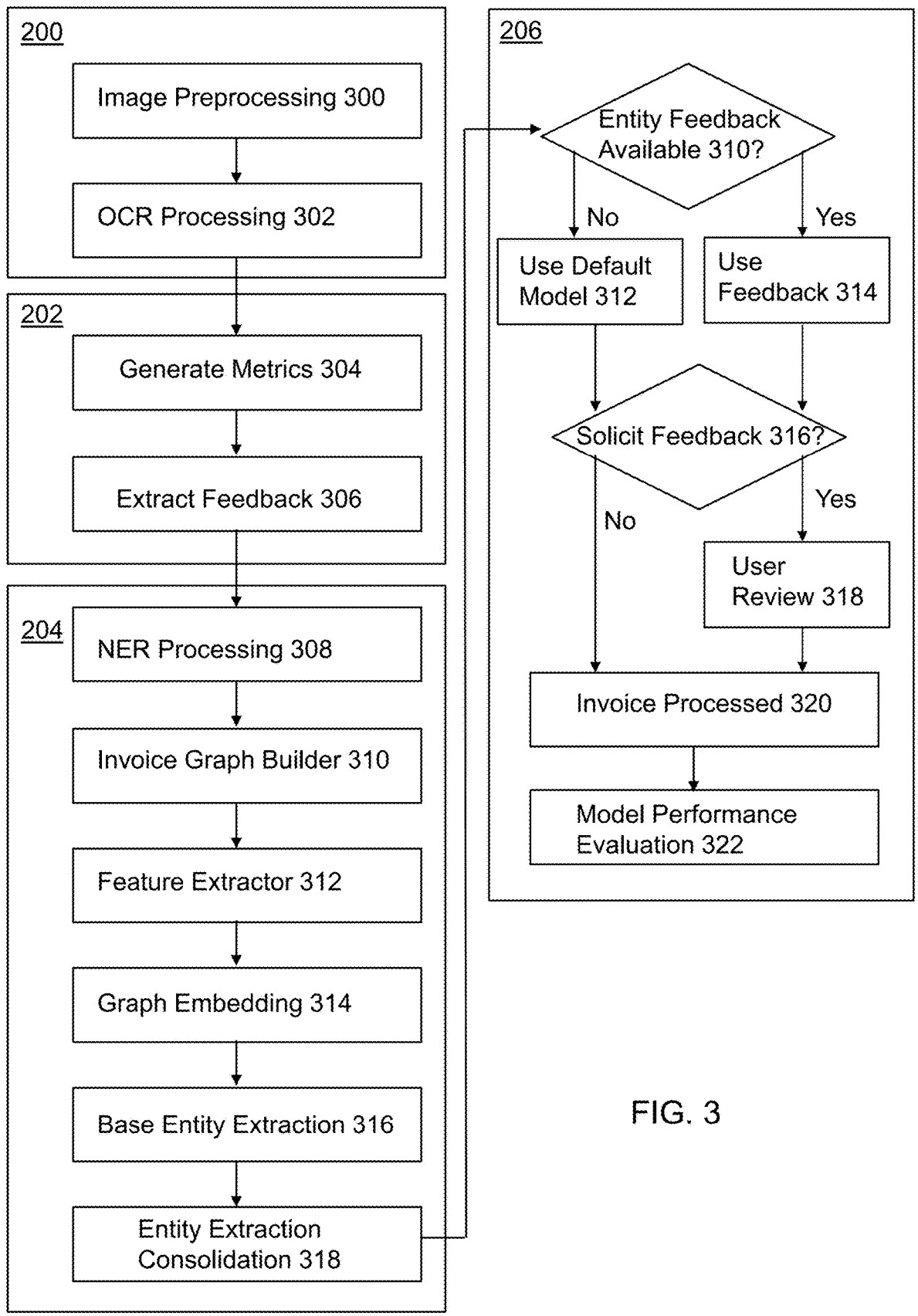
FIG. 3 illustrates invoice processing operations performed in accordance with an embodiment of the invention.

A semantic document processing module 204 performs semantic processing as fully characterized in connection with the discussion of FIG. 3. The entity extraction correction module 206 utilizes collected feedback, if available, to override trained machine learning model processing of the digital invoice, as demonstrated below.

The invoice processing module 142 also includes a model metric store 208, which is a data repository for metric datapoints generated by the metric generator discussed in connection with FIG. 3. The user feedback store 210 is a data repository for user extraction feedback generated by the extracted feedback collector discussed in connection with FIG. 3.

The feature store 212 is a data repository of extracted node features with node embeddings, as discussed below. The extracted invoice store 214 is a collection of all digital invoices processed by the invoice processing module 142.

FIG. 3 illustrates processing performed by different modules disclosed in FIG. 2. The image processing module 200 performs image preprocessing 300. The preprocessing entails transforming an uploaded digital invoice into a format more conducive to subsequent processing, such as a Portable Network Graphics file format. The data is then subject to optical character recognition processing 302 to extract text and text coordinates from the digital invoice.

The evaluation module 202 generates metrics 304. In particular, it generates a metric datapoint characterizing the correctness of each entity in the digital invoice. The evaluation module 202 also extracts feedback 306. In particular, the feedback represents user review of an entity in the digital invoice, as demonstrated below.

The semantic document processing module 204 performs NER processing 308. In particular, Name Entity Recognition (NER) models extract an organization name, invoice date, and invoice amount from the digital invoice, examples of which are supplied below. An invoice graph builder 310 is then invoked to represent a digital invoice as a directed graph with nodes representing text items in the invoice and edges that connect neighboring text items, as discussed in connection with FIG. 8.

A feature extractor is utilized 312. The feature extractor extracts node features, including node embeddings. For example, when a node has a corresponding word, the word is transformed into a numeric vector that encodes the meaning of the word. Words that are closer in the vector space as expected to be similar in meaning.

Graph embedding is then performed 314. In particular, an unsupervised graph convolution neural network predicts an embedding vector for each node in the invoice graph. The embedding vector is a relatively low-dimensional space derived from high-dimensional vectors.

Base entity extraction is then performed 316. In particular, generalized entity extraction models for entities, such as supplier name, bill-to address, total amount, invoice date, are invoked to retrieve such information from the digital invoice.

Extracted entities are then consolidated 318. This module ranks extracted entities from the digital invoice to form a final list of extracted entities.

Processing then proceeds to the entity extraction correction module 206. Overall, this module finds similarity between entities embedded in the current invoice and corresponding entities embedded associated with feedback provided by a user in the past for similar invoices. If similarity is found, the entity extraction correction module 206 overwrites a base model prediction with a user preferred value. The module 206 give the system the ability to adapt to user preferences in real-time and correct the extractions on the fly based on a small number of instances of user feedback.

For any given entity, it is determined whether there is feedback available for that entity 310. That is, it is determined whether a specific user has previously interacted with the given entity in a specific manner, an example of which is provided below. Alternately, it can be determined if a specific user or a user with a similar role in an organization has previously interacted with a similar entity in a specific manner. If not (310—No), default trained machine learning models are used to process the entity. Thus, for example, the trained model may be based upon a training set for the given enterprise or a model trained on invoice processes across many enterprises. If entity feedback is available (310—Yes), such feedback is used 314 to effectively override the default trained machine learning models.

A decision is then made to decide whether to solicit feedback from the user 316 regarding the characterization of the given entity from the digital invoice. If feedback is to be solicited (316—Yes), the user is prompted to review 318 the characterization of the given entity. After user review or if feedback is not solicited (316—No), the invoice is processed 320. The processed invoice is then used for model performance evaluation 322.

Those skilled in the art will appreciate a number of factors associated with the disclosed technology. First, only a few training samples with feedback are needed to recognize an entity type in similar invoices. In a typical machine learning entity extraction model, it generally requires training on hundreds or thousands of samples.

Second, the system can recognize a new type of entity based on a few user provided samples. Thus, building a new model or retraining is not required. With a typical machine learning entity extraction model, one can only extract entities that were defined during model training. Generally, a new model needs to be built to recognize new types of entities. Next, the disclosed model can make customized predictions and adapt to each individual user preference and invoice type. In typical machine learning entity extraction models, the model is trained and tuned to be generalized to make correct predictions in the majority of cases. Finally, the disclosed technique is improved in real-time and makes more accurate predictions with each user interaction with the system. In contrast, with a typical machine learning model, model predictions are improved through retraining with a broader set of data and a new deployment is required.

Figure 4:
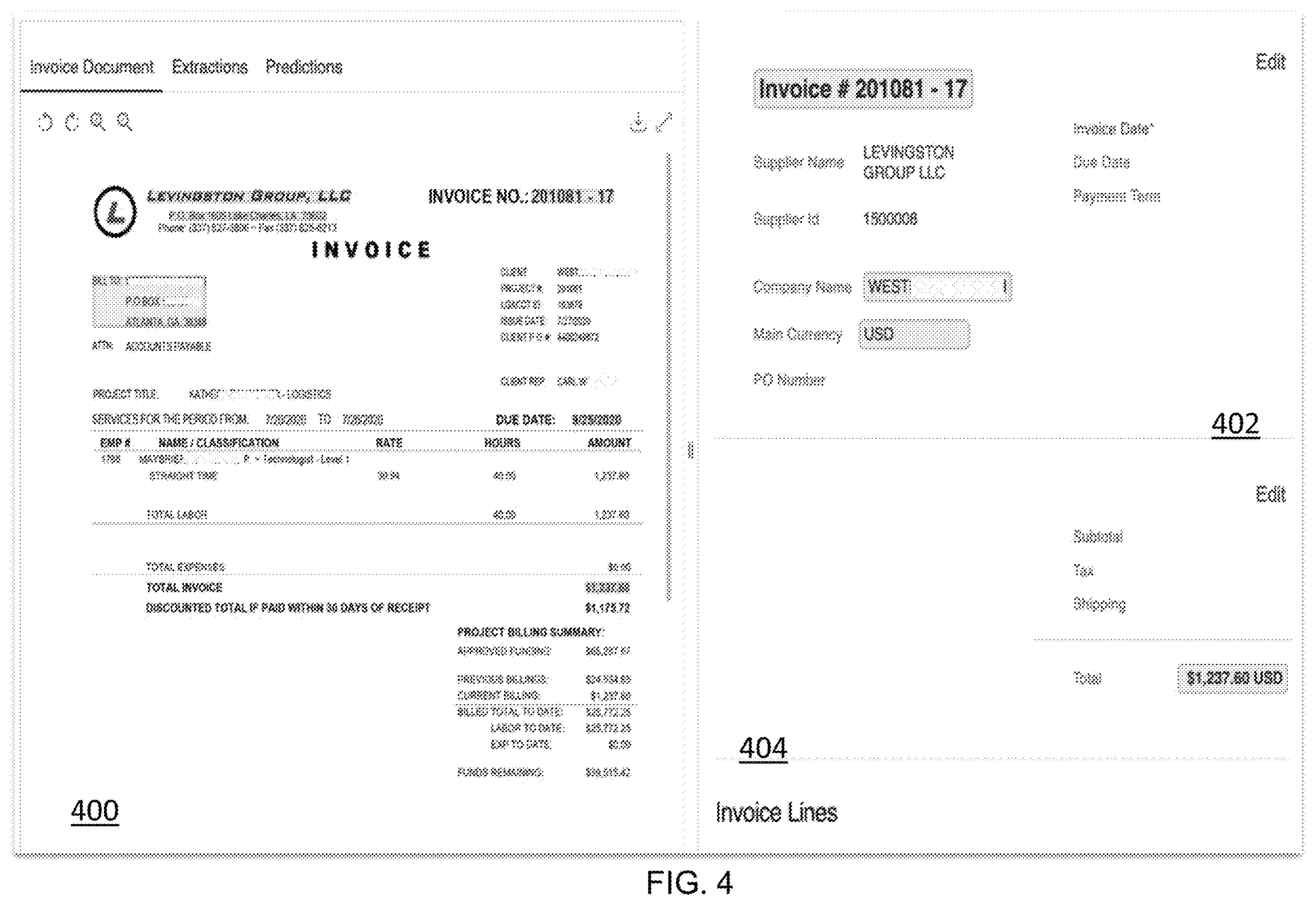

The invention is more fully appreciated in connection with some specific examples. FIG. 4 illustrates an original digital invoice 400. Extracted billing entity information is shown in block 402 and extracted invoice lines are shown in block 404. Initially, the selected invoice total of $1,237.60 is selected by the system.

Figure 5:
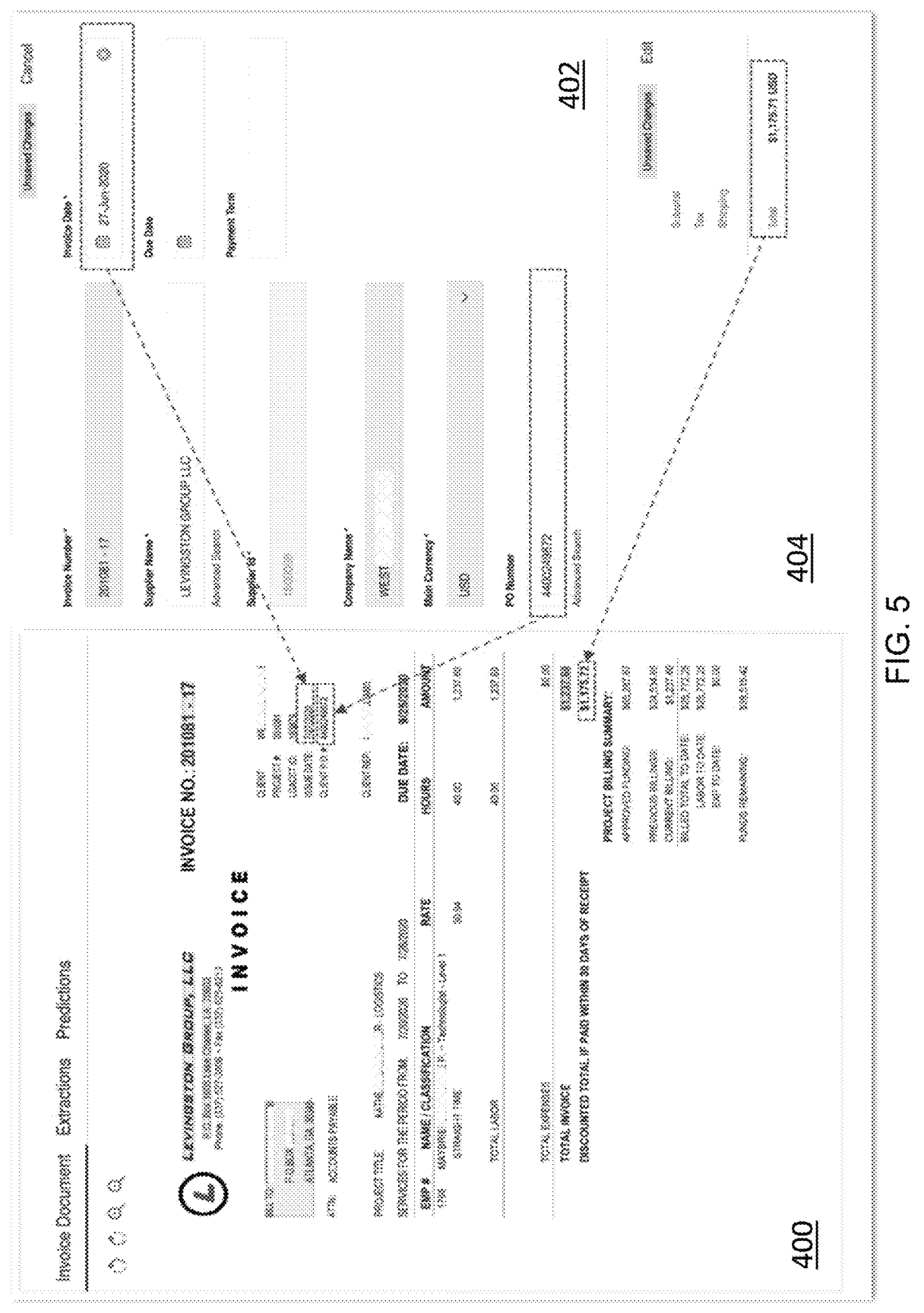

As shown in FIG. 5, a user invokes the edit feature in block 402 to supplement the extracted billing information. In block 404, the edit function is used to modify the extracted invoice line to specify the discounted rate of $1,175.71 when the invoice is paid within 30 days of receipt.

Figure 6:
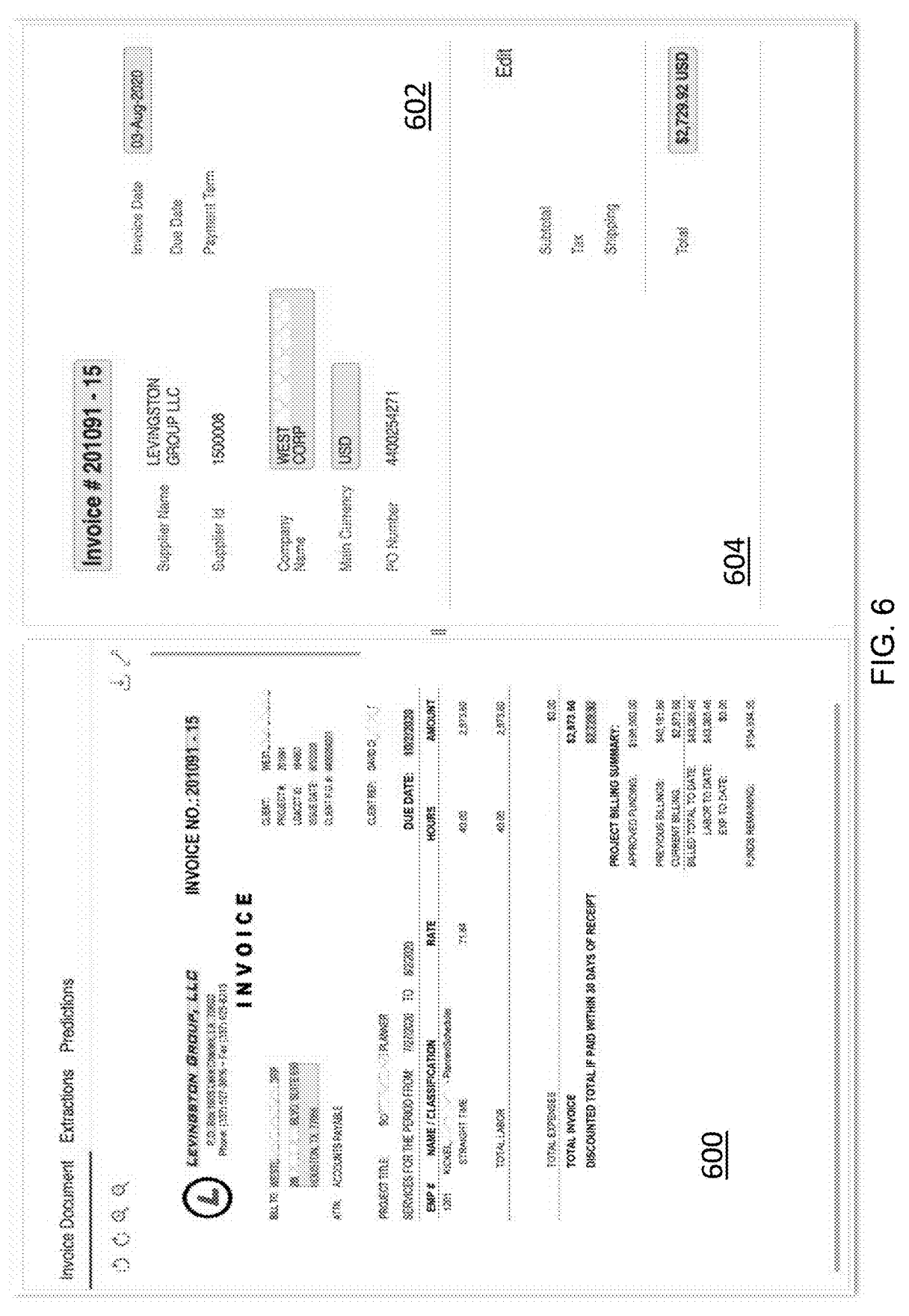

FIG. 6 illustrates a subsequent digital invoice 600 from the same vendor. Block 604 shows an extracted invoice line with the discounted rate automatically selected in view of prior user feedback.

Figure 9:
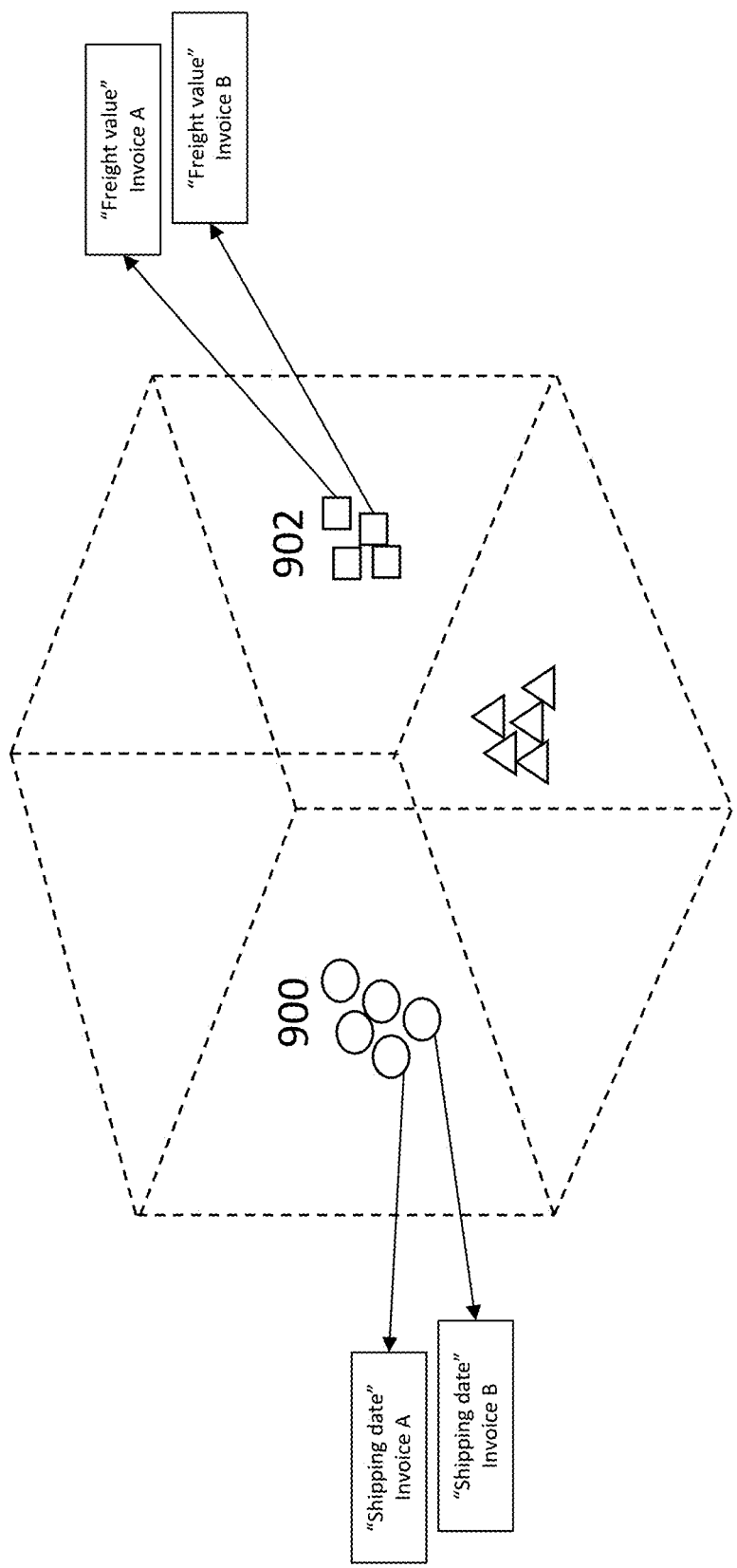
FIG. 9 illustrates invoice text item embeddings achieved in accordance with an embodiment of the invention.

The entity extraction correction module 206 includes a document similarity interface. This module measures similarity between two invoices based on similarity of embedding of nodes of the invoice graphs. Similar invoices have nodes with similar embeddings. As shown in FIG. 7. The document similarity interface finds similar invoices based on similarity of embedding vectors of their entities, such as shown in FIG. 9. This interface assigns to the same cluster invoices that are visually and contextually similar. Invoices are considered as duplicates if their entities have the same vector values and the same embedding cluster as assigned by the document similarity interface. Because entity embedding vectors represent contextual and structural information of the invoice, this approach helps to reduce duplicate false positives.

Figure 8:
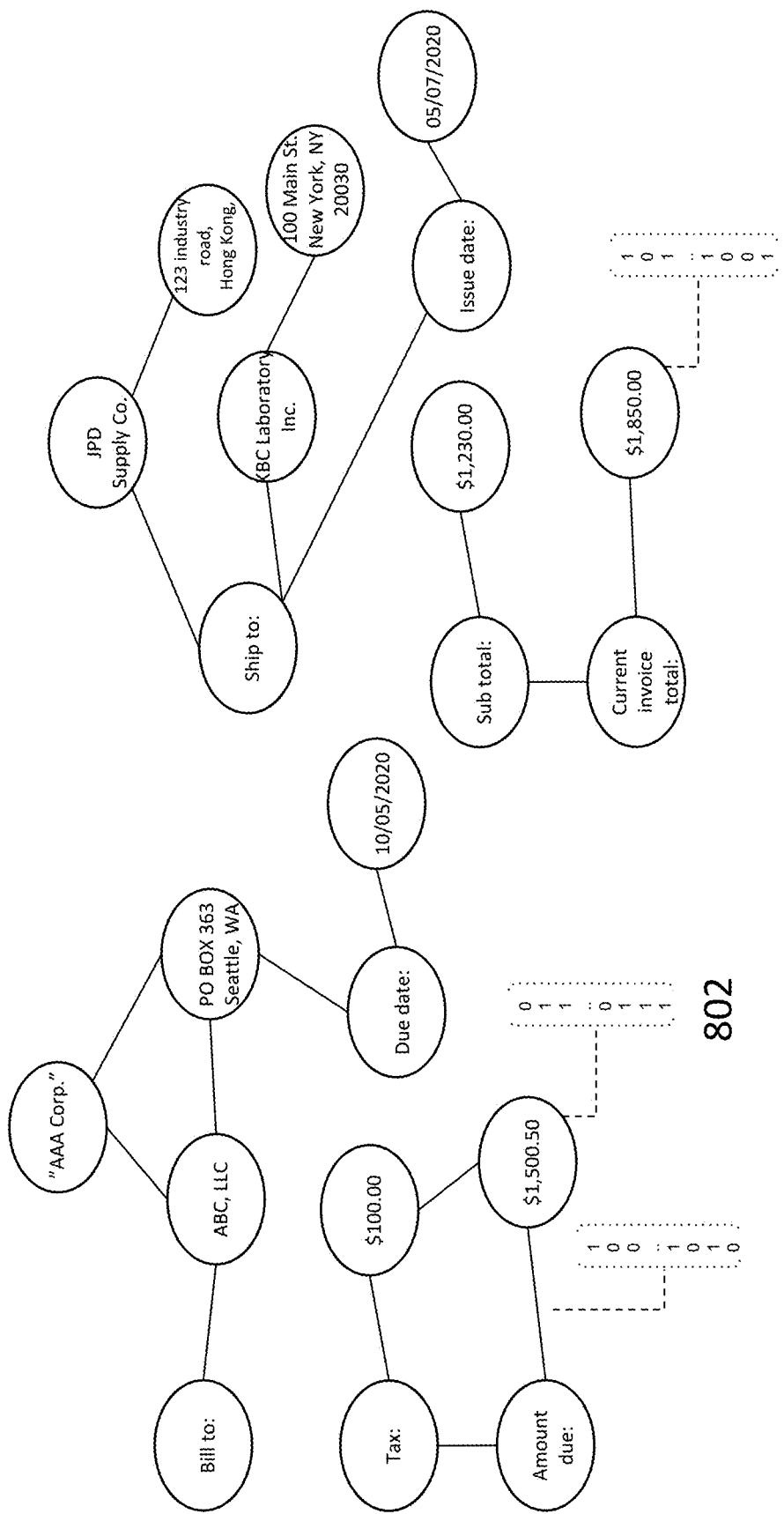
FIG. 8 illustrates invoice documents represented as graphs in accordance with an embodiment of the invention.

FIG. 8 illustrates invoice documents represented as a graph. Although the invoices are from different vendors, they result in similar binary tree structures. The figure illustrates edge embedding 800 representing a connection between two nodes. A node embedding 802 represents the node in the invoice based on neighborhood context.

FIG. 9 illustrates similarity of embedding vectors in three-dimensional space. A shipping date cluster 900 is shown, as well as a freight value cluster 902.

Fast learning is one of the advantages of this system for ML based invoice extraction correction. The system requires two or only a few sample feedbacks to learn and make corrections. The unsupervised generalized Graph Embedding model 314 does not require retraining to assign similar embeddings to similar entities in invoices. As a result, the entity extraction correction module 206 can take one or a few feedbacks from the user and find entities with similar embeddings in the invoices. The whole process takes less than a minute after feedback is submitted. This process occurs in real-time. In contrast, a typical invoice extraction model retraining process involves proper data sampling with hundreds of samples, new deployment and expert intervention.

Customized invoice entity extraction correction is another advantage of the system. It can be generalized to correct entity extraction across all users or it can make extraction correction based on each individual user preferences.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   invoke an image processing module to ingest a digital invoice;
   utilize an evaluation module to derive metrics from the digital invoice;
   execute a semantic document processing module to form entity extracts from the digital invoice, wherein each entity extract from the digital invoice has a potential mapping to a trained machine learning model element;
   run an entity extraction correction module to dynamically override the potential mapping to the trained machine learning model element when user feedback from a similar entity extract from a previously processed digital invoice exists to produce invoice entity feedback override of the potential mapping to the trained machine learning model element; and
   deliver the processed digital invoice to an accounting module for final disposition of the digital invoice.

2. The non-transitory computer readable storage medium of claim 1 wherein the image processing module includes instructions executed by the processor to form a new digital file format.

3. The non-transitory computer readable storage medium of claim 2 wherein the image processing modules includes instructions executed by the processor to perform optical character recognition processing on the new digital file format.

4. The non-transitory computer readable storage medium of claim 1 wherein the evaluation module includes instructions executed by the processor to generate a metric characterizing the correctness of each entity extract from the digital invoice.

5. The non-transitory computer readable storage medium of claim 1 wherein the semantic document processing module includes instructions executed by the processor to invoke Name Entity Recognition (NER) models to extract organization name, invoice date, and invoice amount from the digital invoice.

6. The non-transitory computer readable storage medium of claim 1 wherein the semantic document processing module includes instructions executed by the processor to utilize an invoice graph builder to represent a digital invoice as a directed graph.

7. The non-transitory computer readable storage medium of claim 1 wherein the semantic document processing module includes instructions executed by the processor to run a feature extractor to extracts node features to form node embeddings.

8. The non-transitory computer readable storage medium of claim 1 wherein the semantic document processing module includes instructions executed by the processor to form a graph embedding vector for each node in an invoice graph.

9. The non-transitory computer readable storage medium of claim 1 wherein the semantic document processing modules includes instructions executed by the processor to extract and consolidate a superset of extract entities to form the extract entities.

10. The non-transitory computer readable storage medium of claim 1 wherein the entity extraction correction module includes instructions executed by the processor to solicit user feedback on the potential mapping to the trained machine learning model element or the override of the potential mapping to the trained machine learning model element.

11. The non-transitory computer readable storage medium of claim 1 wherein the entity extraction correction module includes instructions executed by the processor to evaluate machine learning model performance.

12. The non-transitory computer readable storage medium of claim 1 wherein the similar entity extract from the previously processed digital invoice is identified by previously processed digital invoices clustered in a multi-dimensional space.

13. The non-transitory computer readable storage medium of claim 1 wherein the entity extraction correction module overrides the potential mapping to the trained machine learning model element based upon user feedback from two or more similar entity extracts from previously processed digital invoices utilized by a single enterprise.

14. The non-transitory computer readable storage medium of claim 1 wherein the entity extraction correction module overrides the potential mapping to the trained machine learning model element based upon user feedback from two or more similar entity extracts from previously processed digital invoices utilized by a single user.

* * * * *